United States Patent [19]

Miyazaki

[11] Patent Number: 5,151,887
[45] Date of Patent: Sep. 29, 1992

[54] SEPARATION-TYPE OPTICAL INFORMATION RECORDING AND REPRODUCING APPARATUS PRODUCING OFFSET-ELIMINATED FOCUS ERROR SIGNAL

[75] Inventor: Yasuhiro Miyazaki, Hino, Japan

[73] Assignee: Olympus Optical Co., Ltd., Tokyo, Japan

[21] Appl. No.: 511,301

[22] Filed: Apr. 19, 1990

[30] Foreign Application Priority Data

| Apr. 20, 1989 | [JP] | Japan | 1-98674 |
| Jul. 27, 1989 | [JP] | Japan | 1-192711 |
| Oct. 9, 1989 | [JP] | Japan | 1-263387 |

[51] Int. Cl.5 .............................. G11B 7/00
[52] U.S. Cl. .................. 369/44.32; 369/44.11; 369/44.41; 250/201.5
[58] Field of Search ............ 369/44.32, 44.11, 44.12, 369/44.14, 44.23, 44.24, 44.26, 44.32, 44.39, 44.41, 44.42, 32, 50; 250/201.5, 201.1, 201.2

[56] References Cited

U.S. PATENT DOCUMENTS

| 4,819,220 | 4/1989 | Miyazaki et al. | 369/50 |
| 4,959,824 | 9/1990 | Ueda et al. | 369/44.14 |
| 4,977,552 | 12/1990 | Gotoh | 369/44.14 |
| 5,050,152 | 9/1991 | Honda | 369/44.32 |
| 5,060,213 | 10/1991 | Kamisada | 364/44.32 |

FOREIGN PATENT DOCUMENTS

| 61-148630 | 7/1986 | Japan . |
| 61-182640 | 8/1986 | Japan . |
| 63-70930 | 3/1988 | Japan . |

Primary Examiner—Dale M. Shaw
Assistant Examiner—Thai Tran
Attorney, Agent, or Firm—Stevens, Davis, Miller & Mosher

[57] ABSTRACT

An optical information recording and reproducing apparatus includes a separation type pick-up including a stationary unit having a laser diode for emitting a light beam, first and second beam splitters, first and second photodetectors and a focus error detecting optical element such as a critical angle prism and a cylindrical lens, and a movable unit having a reflecting member and an objective lens for projecting the light beam emanating from the stationary unit onto an optical record disk as a light spot and for directing a light beam reflected by the optical record disk to the stationary unit. The light beam reflected by the disk and received by the stationary unit is divided by the second beam splitter into first and second sub-beams, the first sub-beam being made incident upon the first photodetector having two light receiving regions arranged in the tangential direction of the disk via the focus error detecting optical element, and the second sub-beam being made incident upon the second photodetector having two light receiving regions aligned in the tangential direction. A difference signal derived from outputs of the light receiving regions of the second photodetector is subtracted from a difference signal derived from outputs of the light receiving regions of the first photodetector to generate an actual focus error signal from which an offset component is eliminated.

7 Claims, 6 Drawing Sheets

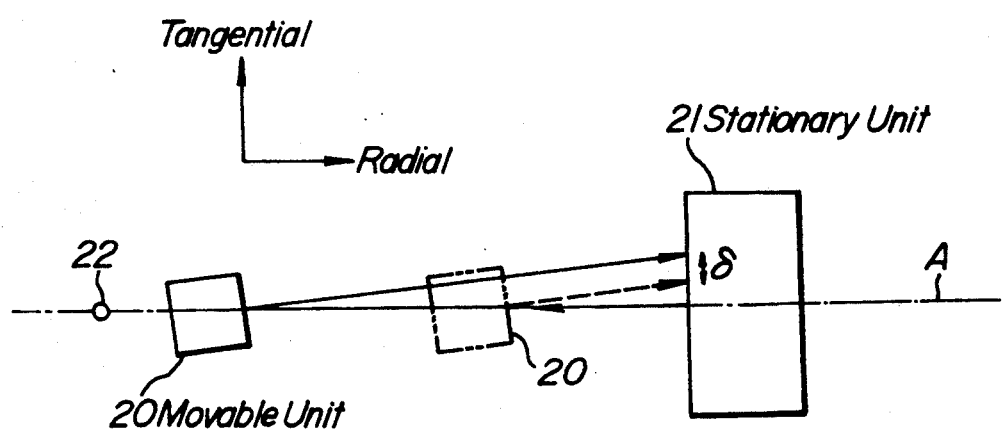
FIG_1
PRIOR ART

FIG._2
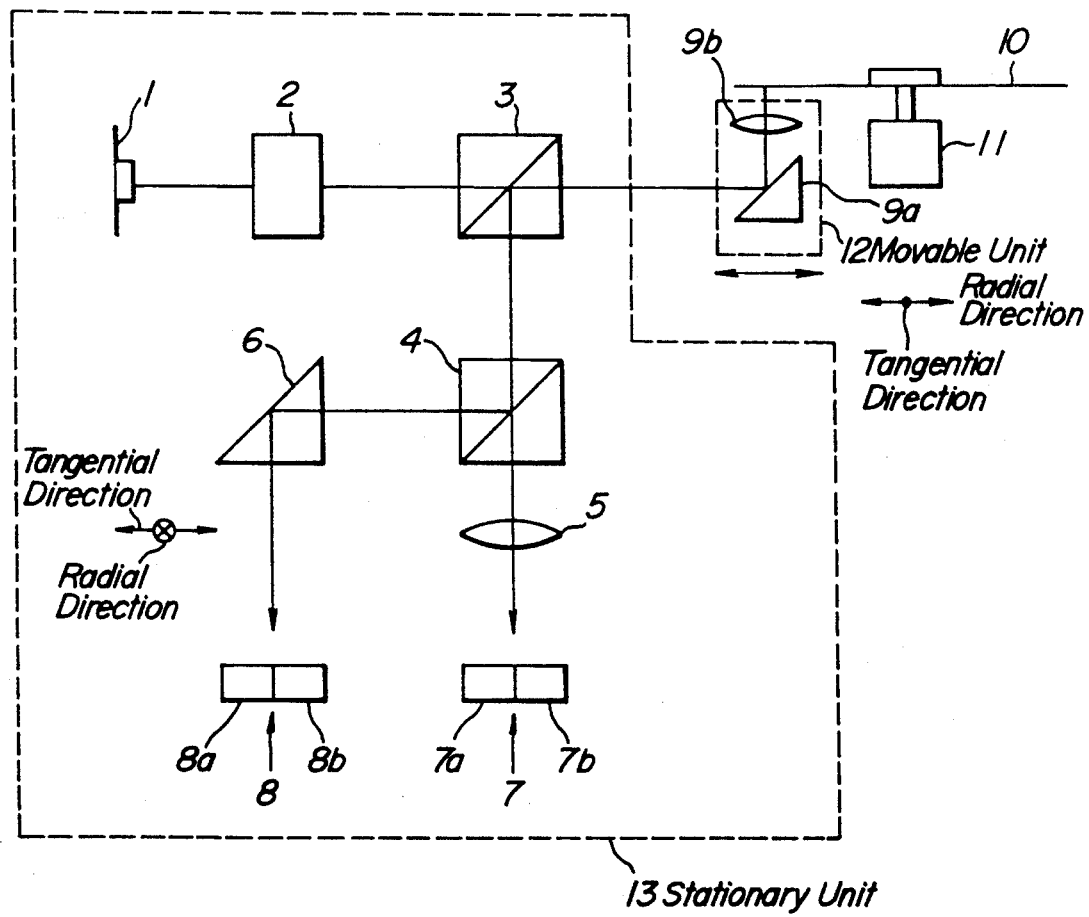
FIG._3
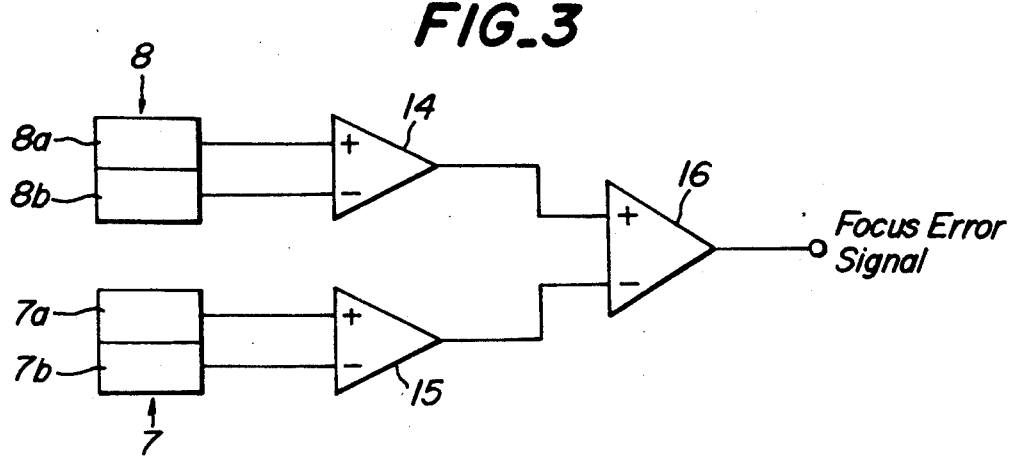

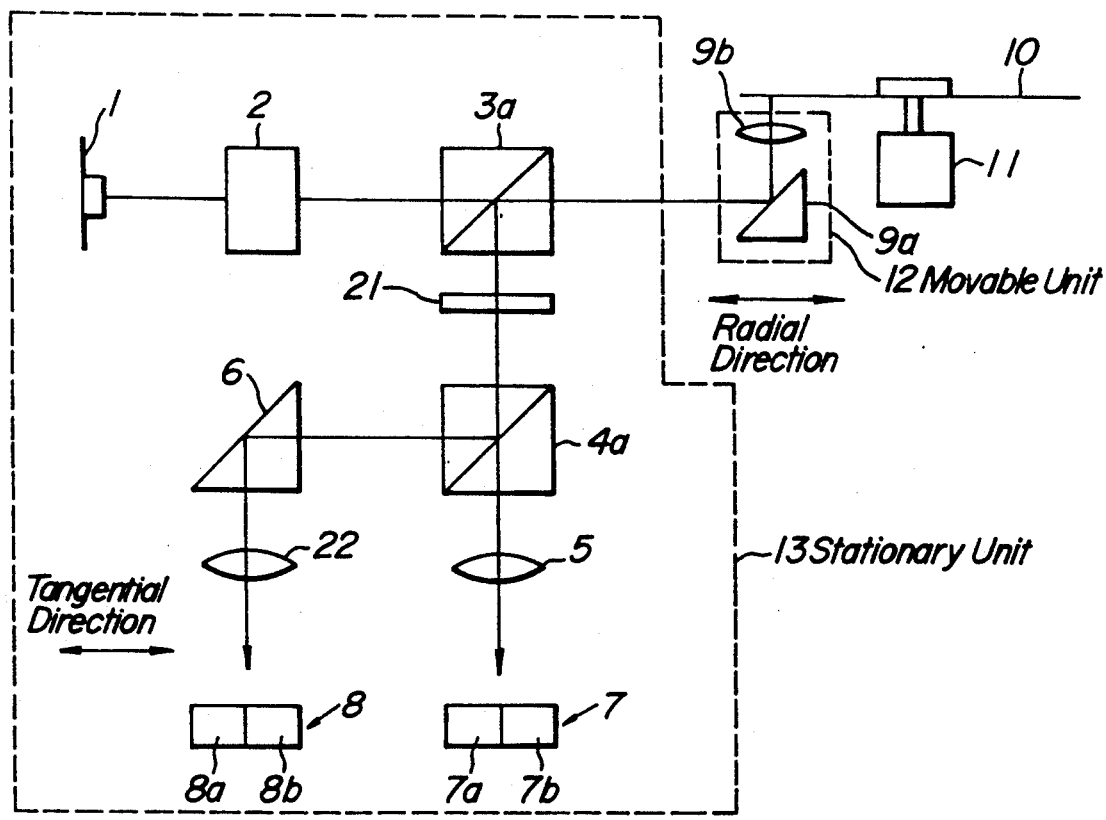
FIG_6

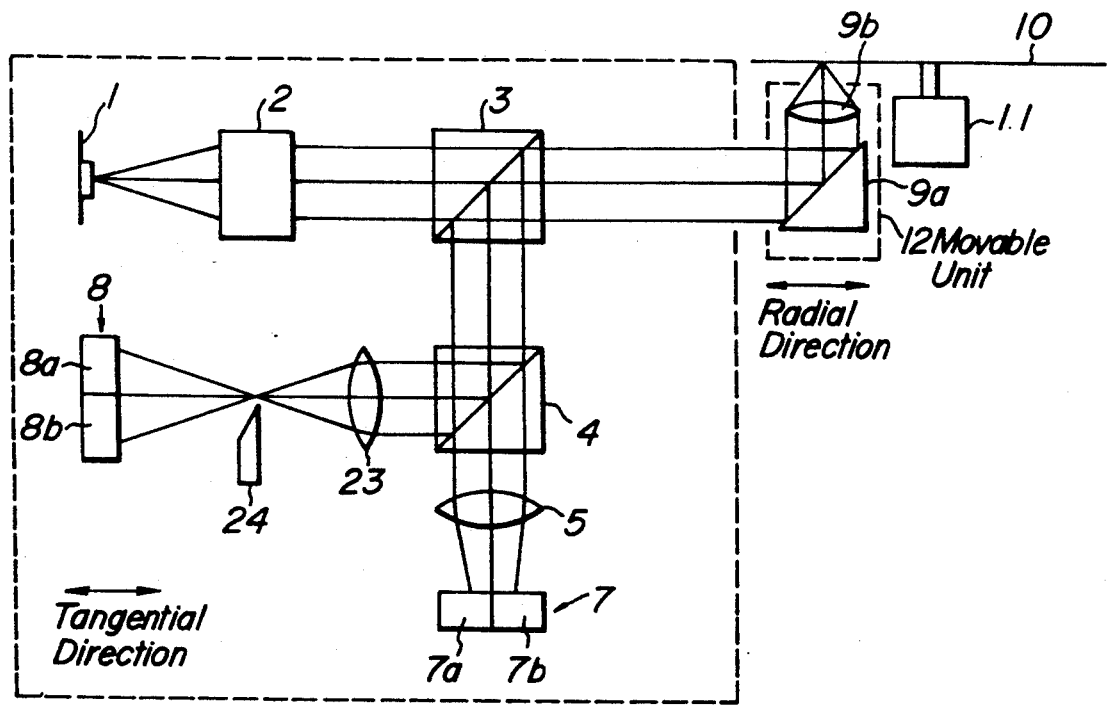
FIG_7

SEPARATION-TYPE OPTICAL INFORMATION RECORDING AND REPRODUCING APPARATUS PRODUCING OFFSET-ELIMINATED FOCUS ERROR SIGNAL

BACKGROUND OF THE INVENTION

Field of the Invention and Related Art Statement

The present invention relates to an optical information recording and reproducing apparatus in which an actual positional error signal can be obtained by eliminating an offset component.

In optical information recording and reproducing apparatuses, a light beam is made incident upon an optical or opto-magnetic information record medium by means of an optical pick-up and an information is reproduced by detecting light reflected by the record medium. As the optical pick-up, there has been recently developed an optical pick-up of separation type in order to access a given information track in the record medium at a high speed.

The separation type optical pick-up comprises a stationary unit having a light source and several optical elements for detecting focusing error, tracking error and information signal, and a movable unit including reflecting member and objective lens for projecting a light beam emitted by the light source onto a desired position on the information record medium. In this manner, the optical system is divided into the stationary and movable units, so that the assembling and adjustment of the light source become easy and further the focusing control can be performed very precisely by adjusting the objective lens provided in the movable unit or the movable unit as a whole. It should be noted that the tracking control can be performed easily by moving the reflecting member or the objective lens or the whole movable unit. When the light spot is to be projected onto a given information track, the light spot is moved over a wide range on the record medium by crossing a plurality of information tracks. This mode of operation is usually called the seek. For performing the seek operation, the movable unit is moved in a direction perpendicular to the information track. That is to say, in case of using an optical information record disk, the movable unit is moved in the radial direction of the disk, i.e. the tangential direction of the circular information track.

The inventor of the instant application has confirmed that in the known optical information recording and reproducing apparatus comprising the separation type pick-up, the focusing control could not be performed accurately due to various factors. For instance, when an optical axis of a light beam emanating from the stationary unit is inclined with respect to an axis along which the movable unit is driven, when the position of the movable unit varies in the tangential direction of the optical disk in dependence on a position on the radial direction of the disk due to a mechanical error, when the optical axis is deviated due to the thermal property of various portions of the optical information recording and reproducing apparatus, when the optical record disk has an inclination in the tangential direction, when the inclination of a turntable rotated by a spindle motor is changed with respect to the optical system due to the secular variation, and when the disk groove crossing signal is leaked into the tangential direction, there is introduced an offset in the focus error signal, and thus the focusing error could not be detected accurately and thus the focusing control could not be performed precisely.

FIG. 1 is a schematic view for explaining the manner of generating the deviation in the tangential direction when the optical axes of the movable and stationary units are inclined with respect to the axis along which the movable unit is driven. When an optical system arranged in a movable unit 20 has an optical axis which is inclined with respect to an axis A along which the movable unit is moved, optical axes of light beams emanating from the movable unit are deviated in the tangential direction by an amount δ on the optical system of the stationary unit 21. That is to say, when the movable unit 20 is moved in the radial direction of the optical information record disk from the position shown by a solid line in FIG. 1 to a position shown by a chain line, a position of the stationary unit 21 at which the light beam emanating from the movable unit is received is shifted in the tangential direction. In FIG. 1, a reference numeral 22 denotes a position of the spindle motor. Due to this deviation in the tangential direction, the light amount distribution impinging upon a focus error detecting optical system is deviated in the tangential direction, so that the detected focus error signal includes the offset.

In Japanese Patent Application Laid-open Publication Kokai Sho 61-182640, there is described one solution for eliminating the offset due to the deviation of the optical axis of the pick-up of separation type. In this known solution, the deviation of an incident angle of a light beam impinging upon the reflecting member in the movable unit is detected and a mutual positional relationship between the stationary unit and the movable unit is adjusted in accordance with the detected deviation of the incident angle by means of, for instance, a yawing mechanism. To this end a photo-detector having two light receiving regions for detecting the deviation in the incident angle and a beam splitting means for introducing a light beam into the photodetector have to be arranged on the movable unit. Therefore, the weight of the movable unit becomes heavy and the seek property becomes worse. That is to say, the movable unit could not be moved in the radial direction of the optical information disk at a high speed for effecting the seek operation.

In Japanese Patent Application Laid-open Publication Kokai Sho 61-14863, there is disclosed another known solution for removing the offset in the focus error. In this known solution, the light beam is divided into two beams in the actuator, i.e. movable unit, and one of beams is used as a usual beam for effecting the recording, reproducing and erasing. The other beam is reflected within the actuator and the thus reflected light beam and the light beam reflected by the optical record disk are traveled along the same optical path toward the stationary unit. In the stationary unit, these beams are separately detected to derive a signal representing the offset of the focus error. In this known solution, beam splitter, a quarter wavelength plate and reflection mirror have to be provided in the movable unit, so that the movable unit becomes heavy and thus the seek property is deteriorated. Further the beam splitter for introducing the light beam into the photodetector for detecting the deviation of the optical axis is arranged in the stationary unit, a large amount of P-polarizing component returns to the light source.

SUMMARY OF THE INVENTION

The present invention has for its object to provide a novel and useful optical information recording and reproducing apparatus which can produce a signal representing the actual focus error by eliminating the offset without providing any additional optical element in the movable unit, so that the seek operation can be effected at a high speed.

According to the invention, in an optical information recording and reproducing apparatus including a stationary unit arranged stationarily with respect to an optical record disk in which at least one circular information track is formed and a movable unit which is arranged movably in a radial direction of the information track in the optical record disk, the improvement being characterized in that said stationary unit comprises a light source for emitting a light beam, a first beam splitting means for directing the light beam emitted from the light source to the movable unit and directing a light beam transmitted from the movable unit into a direction which is different from a direction toward the light source, a second beam splitting means for separating the light beam emanating from the first beam splitting means into first and second sub-beams, a first photodetecting means having at least two light receiving regions arranged in a tangential direction of the information track, a second photodetecting means having at least two light receiving regions arranged in the tangential direction of the information track, and a focus error detecting optical element arranged in the first sub-beam emanating from the second beam splitting means, said focusing error detecting optical element introducing a change in a light amount distribution of the first sub-light beam in the tangential direction;

said movable unit comprises an objective lens for projecting the light beam emanating from said first beam splitting means onto the optical record disk as a light spot; and said apparatus further comprises a calculating means for deriving a focus error signal from a first signal supplied from the first photodetecting means and including a signal component representing the focus error and a second signal supplied from said second photodetecting means and having a signal component representing a change in the light amount distribution in the tangential direction due to factors other than the focus error.

According to the present invention, the second photodetecting means receives the second sub-beam which is not subjected to the influence of the focus error detecting optical element and thus the second signal represents only the offset component. Therefore, by subtracting the second signal from the first signal, the offset component can be removed from the first signal. In this manner, the focus error can be detected accurately, so that the focus servo control can be performed precisely. Further, any additional optical element is not provided in the movable unit, the weight of the movable unit is not increased at all and therefore the seek operation can be carried out at a high speed.

BRIEF DESCRIPTION OF THE DRAWINGS

FIG. 1 is a schematic view for explaining the manner of generating the offset due to the deviation in the optical axis;

FIG. 2 is a schematic view illustrating the construction of a first embodiment of the optical information recording and reproducing apparatus according to the invention;

FIG. 3 is a circuit diagram showing a calculating circuit of the apparatus shown in FIG. 2;

FIG. 6 is a schematic view showing a second embodiment of the apparatus according to the invention; and FIG. 7 is a schematic view illustrating a third embodiment of the apparatus according to the invention.

DESCRIPTION OF THE PREFERRED EMBODIMENT

Figure 4:
FIG. 4 is a diagram for explaining the manner of producing the offset in the focus error.

FIG. 2 is schematic view showing a first embodiment of the optical information recording and reproducing apparatus according to the invention. It should be noted that in the present embodiment, an optical record disk 10 is formed by an ordinary one in which information is recorded as physical or optical pits. The optical disk 10 is rotated by a spindle motor 11. A movable unit 12 is arranged beneath the disk 10. The movable unit 12 comprises a reflecting member 9a for reflecting a light beam emanating from a stationary unit 13 and a light beam reflected by the disk 10 toward the stationary unit, and an objective lens 9b for focusing the light beam reflected by the reflecting member 9a onto the record disk 10 and for collecting light rays reflected by the disk. The focus control is effected by moving the movable unit 12 as a whole or the objective lens 9b.

The stationary unit 13 is arranged separately from the movable unit 12 so as to construct the separation type optical pick-up. The stationary unit 13 comprises a light source 1 constituted by a laser diode for emitting a linearly polarized light beam, a collimator lens 2 for converting the light beam emitted by the laser diode 1 into a parallel light beam and a first beam splitter 3. The parallel light beam transmitted through the first beam splitter 3 is directed to the movable unit 12 and is reflected upward by the reflecting member 9a provided in the movable unit. The light reflected by the reflecting member 9a is focused by the objective lens 9b onto the record disk 10 as the light spot. The light beam reflected by the disk 10 is collected by the objective lens 9b and is then reflected by the reflecting member 9a toward the first beam splitter 3 provided in the stationary unit 13. The light beam impinging upon the first beam splitter 3 is reflected thereby in a direction which is different from that directed to the laser diode 1. It should be noted that in FIG. 2 the stationary unit 13 is viewed from a direction which is different from that in which the movable unit 12 and disk 10 are viewed. That is to say, the movable unit 12 and disk 10 are viewed in the tangential direction of the information track, but the stationary unit 13 is viewed in the radial direction of the disk.

The light beam reflected by the first beam splitter 3 is then made incident upon a second beam splitter 4 and is divided thereby into first and second sub-beams. The first sub-beam reflected by the second beam splitter 4 is made incident upon a focus detection prism 6 having a reflection surface 6a which is arranged substantially at a critical angle of reflection with respect to a principal light ray of the first sub-beam which is reflected by the record disk 10 in the infocused condition. The first sub-beam reflected by the prism 6 is received by a first photodetector 8 having two light receiving regions 8a and 8b which are arranged in the tangential direction. The second sub-beam transmitted through the second beam splitter 4 is collected by a lens 5 and is made incident upon a second photodetector 7 having two light receiving regions 7a and 7b which are also aligned in the tangential direction.

FIG. 3 is a circuit diagram showing a calculating circuit for deriving a signal representing the actual focus error without being affected by the offset. Output signals generated from the light receiving regions 8a and 8b of the first photodetector 8 are supplied to a first differential amplifier 14 to derive a first difference between these output signals. The focus error detecting technique using the prism having the reflection surface set substantially at the critical angle of reflection has been well known in the art and has been fully explained in, for instance, U.S. Pat. No. 4,390,781, so that its explanation is omitted in the present specification. If there is no offset, this difference signal represents the actual focus error. However, in practice, the first difference signal derived from the first differential amplifier 14 contains the offset due to various factors such as the deviation in the optical axes of the movable unit 12 and stationary unit 13, the inclination of the disk in the tangential direction, and the variation in the light amount distribution in the tangential direction when the light spot crosses the information tracks. In other words, the first sub-beam impinging upon the first photodetector 8 contains not only the variation in the light amount distribution in the tangential direction due to the actual focus error, but also the variation in the light amount distribution in the tangential direction due to the above mentioned various factors. In the present invention, in order to eliminate the offset in the first difference signal, the variation in the light amount distribution in the tangential direction due to the factors except for the focus error is detected separately. To this end, the second sub-beam is detected by the second photodetector 7 and output signals produced by the light receiving regions 7a and 7b are supplied to a second differential amplifier 15 to derive a second difference signal therebetween. The second difference signal thus derived from the second differential amplifier 15 represents the variation of the light amount distribution in the tangential direction, i.e. the offset component contained in the first difference signal supplied by the first differential amplifier 14. Then, the first difference signal supplied by the first differential amplifier 1 and the second difference signal produced by the second differential amplifier 14 are supplied to a third differential amplifier 16 to derive a third difference signal. It is apparent that the second difference signal is subtracted from the first difference signal in the third differential amplifier 16, the third difference signal supplied from the third differential amplifier represents the actual focus error signal which does not include the offset component. In this manner, according to the present invention, it is possible to obtain the actual focus error signal accurately without providing any additional element in the movable unit 12, so that the weight of the movable unit is not increased at all and the seek operation can be effected at a high speed.

FIG. 4 is a diagram showing the principle of the manner of deriving the actual focus error by eliminating the offset component. As explained above, the first photodetector 8 detects the distribution of light in the tangential direction including components due to the focus error and due to the deviation in the optical axis, and the second photodetector 7 detects the distribution of light in the tangential direction only due to the deviation in the optical axis. When there is no deviation in the optical axis in the tangential direction, the differences between the outputs from the light receiving regions in the tangential direction become zero as illustrated in an upper column in FIG. 4. That is to say, $(A+D)-(B+C)=(A'+D')-(B'+C')=0$. When the optical axis is deviated in the tangential direction, in the first photodetector 8, there is produced the offset component as shown by $\delta_T$ in FIG. 4, and in the second photodetector 7, only the offset component $\delta_T'$ is detected. Therefore, when a product of a certain constant and the second difference signal in the tangential direction is subtracted from the first differential signal in the tangential direction, it is possible to derive the actual focus error which does not include the offset component. That is, to say, the actual focus error E can be derived by the following equation.

$$E=\{(A+D)-(B+C)\}-G_1\{(A'+D')-(B'+C')\}$$

It should be noted that the constant $G_1$ can be determined such that the following equation is satisfied in the ideal condition in which no focus error is produced.

$$(A+B+C+D)=G_1(A''+B'+C'+D')$$

According to the invention, the light beam reflected by the disk 10 is divided into the first and second sub-beams and (1) the focus error including the offset component and (2) the offset component are separately detected, so that the actual focus error signal from which the offset due to the disk groove crossing signal leaked in the tangential direction is eliminated can be equally obtained. That is to say, when the constant $G_1$ is determined in the manner explained above, an amount of the groove crossing signal leaked into the focus error becomes also minimum.

Figure 5:
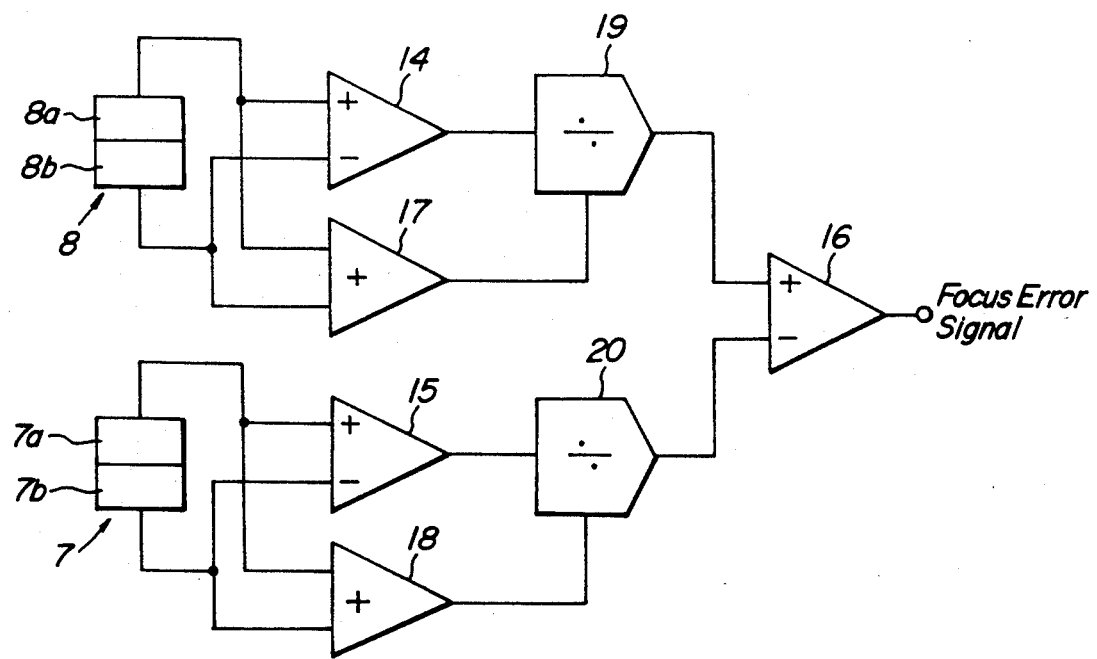
FIG. 5 is a circuit diagram depicting another embodiment of the calculating circuit according to the invention.

FIG. 5 is a circuit diagram showing another embodiment of the calculating circuit according to the invention. In the present embodiment, the output signals produced by the light receiving regions 8a and 8b of the first photodetector 8 are supplied to the first differential amplifier 14 to derive the first differential signal and at the same time are supplied to a first adder 17 to derive a first sum signal. Similarly the output signals of the second photodetector 7 are supplied to the second differential amplifier 15 to derive a second difference signal as well as to a second adder 18 to derive a second sum signal. Then the first difference signal and first sum signal are supplied to a first divider 19 to derive a first division signal and the second difference signal and second sum signal are supplied to a second divider 20 to derive a second division signal. These first and second division signals are then supplied to the third differential amplifier 16 to derive the third difference signal. Now it is assumed that each of the reflectance and transmissivity of the second beam splitter 4 are 50 percent and the reflectance of the prism 6 is 70 percent. Then, a ratio of amounts of light beams impinging upon the first and second photodetectors 8 and 7 is not equal to 1:1, but becomes 35:50. In the present embodiment, since the first and second difference signals are normalized by the first and second sum signals, respectively, the above mentioned imbalance can be compensated for. That is to say, even if amounts of light beams impinging upon the first and second photodetectors 8 and 7 differ from each other, the constant $G_1$ is not necessarily adjusted and the following relation is always satisfied: $(A-B):G_1(A'-B')=1:1$. Therefore, the third difference signal supplied from the third differential amplifier 16 represents the real focus error which does not include the offset due to various factors and the variation due to the unbalance of the amounts of the light beams impinging upon the first and second photodetectors 8 and 7. It should be noted that an amplifier may be provided between the second divider 20 and the third differential amplifier 16 in order to adjust the constant $G_1$.

FIG. 6 is a schematic view showing a second embodiment of the optical information recording and reproducing apparatus according to the present invention. In the present embodiment, portions similar to those shown in FIG. 2 are denoted by the same reference numerals used in FIG. 2. In the present embodiment, the opto-magnetic record disk is used as the optical record disk and the focus error is detected by means of the prism having the reflection surface which is set substantially at the critical angle of reflection with respect to the principal light ray of the light beam impinging upon the prism in the in-focused condition. In the present embodiment, the first and second beam splitters 3 and 4 are formed by polarizing beam splitters 3a and 4a, a half wavelength plate 21 is arranged between the first and second polarizing beam splitters, and a lens 22 is arranged between the prism 6 and the first photodetector 8. The linearly polarized light beam emitted from the laser diode 1 is made incident upon the opto-magnetic disk 10 and the polarizing direction is rotated in accordance with the information stored in the disk due to the Kerr rotation. The light beam reflected by the disk 10 is made incident upon the first polarizing beam splitter 3a and an almost all light beam is reflected by the splitter. The polarizing direction of the light beam is then rotated by 45 degrees by the half wavelength plate 21 and is made incident upon the second polarizing beam splitter 4a. The light beam reflected by the second polarizing beam splitter 4a is made incident upon the prism 6 and light reflected by the prism is projected onto the first photodetector 7 by means of the lens 22. The light beam transmitted through the second polarizing beam splitter 4a is projected onto the second photodetector 7 by means of the lens 5.

In the present embodiment, the focus error signal can be obtained by $(A-B)-G_1(A'-B')$ in the same manner as that of the first embodiment and the offset due to the various factors such as the deviation in the optical axis, the inclination of the disk and the leakage of the track crossing can be eliminated effectively. The information signal can be derived from an equation of $(A+B)-G_2(A'+B')$. The constant $G_1$ can be determined in a similar manner as that explained above and the constant $G_2$ may be determined to obtain the information signal having the maximum amplitude.

FIG. 7 is a schematic view illustrating a third embodiment of the optical information recording and reproducing apparatus according to the invention. In the present embodiment, the focus error is detected by the known knife edge method. The first sub-beam reflected by the second beam splitter 4 is collected by a lens 23 and a knife edge 24 is arranged substantially at a focal point of the lens 23 so as to shield a part of the first sub-beam, and the remaining light is made incident upon the first photodetector 8. The second sub-beam which is transmitted through the second beam splitter 4 is collected by the lens 5 and is made incident upon the second photodetector 7. Also in the present embodiment, the actual focus error can be derived in the same manner as that of the previous embodiments in accordance with the above mentioned equation $(A-B)-G_1(A'-B')$.

The present invention is not limited to the embodiments explained above, but various alternations and modifications may be conceived by those skilled in the art within the scope of the invention. For instance, the focus error may be detected in accordance with the known astigmatism method in which an optical element such as a cylindrical lens for introducing the astigmatism is arranged to cause the variation in the shape of the light spot formed on the photodetector.

The actual focus error signal thus obtained is supplied to a focus control circuit which produces a focus control signal and the objective lens 9b or the whole movable unit 12 is moved in the direction of the optical axis of the objective lens to perform the focus servo control. According to the invention, the actual focus error can be detected while the offset is eliminated, so that the focus servo control can be effected in a precise manner. Further no additional optical element is provided in the movable unit, and thus the weight of the movable unit is not increased and the seek operation can be carried out at a high speed. According to the invention, even if the variation in the light distribution occurs in the tangential direction due to various factors except for the actual focus error such as the deviation of the optical axis with respect to the axis along which the movable unit is driven, the positional deviation of the movable unit in the tangential direction due to the mechanical error as well as the variation in the thermal property, the inclination of the disk in the tangential direction, the variation in the inclination angle in the radial direction, and the leakage of the track crossing signal into the tangential direction, the actual error can be detected precisely. Therefore, the focus servo control can be performed very precisely without increasing the weight of the movable unit, and thus the recording, reproducing, erasing and seek can be effected stably.

What is claimed is:

1. An optical information recording and reproducing apparatus, comprising:
   (a) a stationary unit which is fixed with respect to an optical record disk in which at least one circular information track is formed; and
   (b) a movable unit which is arranged movably in a radial direction of the information track in the optical record disk,
   said stationary unit comprising a light source for emitting a light beam, a first beam splitting means for directing the light beam emitted from the light source to the movable unit and directing a light beam transmitted from the movable unit in a direction which is different from a direction toward the light source, a second beam splitting means for separating the light beam emanating from the first beam splitting means into two sub-beams, a first photodetecting means having a least two light receiving regions arranged in a tangetial direction of the information track, a second photodetecting means having at least two light receiving elements arranged in the tangetial direction of the information track, and a focusing error detecting optical element arranged in the first sub-beam emanating from the second beam splitting means, said focusing error detecting optical element introducing a change in a light amount distribution of the first sub-light beam in the tangential direction;

said movable unit comprising an objective lens for projecting the light beam emanating from said first beam splitting means onto the optical record disk as a light spot; and (c) a calculating circuit means for deriving a focus error signal from a first signal supplied from the first photodetecting means and including a signal component representing the focus error and a second signal supplied from said second photodetection means and having a signal component representing a change in the light amount distribution in the tangential direction due to factors other than the focus error, wherein said calculating circuit means comprises a first differential amplifier for deriving a first difference signal between the output signals supplied from the first photodetecting means, a first adder for deriving a first sum of the output signals supplied from the first photodetecting means, a first divider for deriving as said first signal a first division signal between the first difference and sum signals, a second differential amplifier for deriving a second difference signal between the output signals supplied from the second photodetecting means, a second adder for deriving a second sum of the output signals supplied from the second photodetecting means, a second divider for deriving as said second signal a second division signal between the second difference signal and the sum signal, and a third differential amplifier for deriving a third difference signal between said first and second division signals as the actual focus signal.

2. An apparatus according to claim 1, wherein each of said first and second beam splitting means is formed by a beam splitter.

3. An apparatus according to claim 1, wherein each of said first and second beam splitting means is formed by a polarizing beam splitter.

4. An apparatus according to claim 3, wherein said optical record disk is formed as an opto-magnetic record disk, said light source is constructed to emit a linearly polarized light beam, and said stationary unit further comprises a half wavelength plate arranged between the first and second polarizing beam splitting means.

5. An apparatus according to claim 4, wherein said light source comprises a laser diode for emitting the linearly polarized light beam and a collimator lens for collimating the light beam emitted by the laser diode into a parallel light beam.

6. An apparatus according to claim 1, wherein said focus error detecting optical element comprises a prism having a reflection surface which is arranged substantially at a critical angle of reflection with respect to a principal light ray of the first sub-beam when there is no focus error.

7. An apparatus according to claim 1, wherein said focus error detecting optical element comprises a lens for focusing the first sub-beam emanating from the second beam splitting means, and a knife edge arranged substantially at a focal point of said lens for shielding a part of the first sub-beam.

* * * * *